US012633601B2

(12) United States Patent
Yoo et al.

(10) Patent No.: US 12,633,601 B2
(45) Date of Patent: May 19, 2026

(54) BATTERY RACK AND POWER STORAGE DEVICE COMPRISING SAME

(71) Applicant: LG ENERGY SOLUTION, LTD., Seoul (KR)

(72) Inventors: Jae-Min Yoo, Daejeon (KR); Jeong-O Mun, Daejeon (KR); Eun-Gyu Shin, Daejeon (KR); Yoon-Koo Lee, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1121 days.

(21) Appl. No.: 17/426,070

(22) PCT Filed: May 12, 2020

(86) PCT No.: PCT/KR2020/006235
§ 371 (c)(1),
(2) Date: Jul. 27, 2021

(87) PCT Pub. No.: WO2020/246722
PCT Pub. Date: Dec. 10, 2020

(65) Prior Publication Data
US 2022/0102792 A1 Mar. 31, 2022

(30) Foreign Application Priority Data

Jun. 5, 2019 (KR) ........................ 10-2019-0066644

(51) Int. Cl.
*H01M 50/143* (2021.01)
*H01M 10/613* (2014.01)
(Continued)

(52) U.S. Cl.
CPC ....... *H01M 50/143* (2021.01); *H01M 10/613* (2015.04); *H01M 10/6556* (2015.04);
(Continued)

(58) Field of Classification Search
CPC ........ A62C 3/16; Y02E 60/10; H01M 10/613; H01M 10/627; H01M 10/6556;
(Continued)

(56) References Cited

U.S. PATENT DOCUMENTS

2009/0142653 A1* 6/2009 Okada ................. H01M 50/209
429/120
2012/0270075 A1 10/2012 Fujimura
(Continued)

FOREIGN PATENT DOCUMENTS

CN 106030231 A 10/2016
JP 2011-249225 A 12/2011
(Continued)

OTHER PUBLICATIONS

European Search Report for Application No. 20818358.2. dated May 25, 2022.
(Continued)

*Primary Examiner* — Lingwen R Zeng
(74) *Attorney, Agent, or Firm* — Birch, Stewart, Kolasch & Birch, LLP

(57) ABSTRACT

A battery pack includes a plurality of battery modules, each having at least one battery cell, a rack case configured to accommodate the plurality of battery modules, and a fire proof unit mounted to be spaced apart from each other by a predetermined distance along a vertical direction of the rack case and configured to support the battery modules and prevent flame and heat from propagating to adjacent battery modules when a fire occurs in at least one of the plurality of battery modules.

10 Claims, 8 Drawing Sheets

(51) Int. Cl.

| | |
|---|---|
| *H01M 10/6556* | (2014.01) |
| *H01M 10/6563* | (2014.01) |
| *H01M 10/6566* | (2014.01) |
| *H01M 50/211* | (2021.01) |
| *A62C 3/16* | (2006.01) |
| *H01M 10/627* | (2014.01) |
| *H01M 10/6567* | (2014.01) |
| *H01M 10/6568* | (2014.01) |
| *H01M 50/204* | (2021.01) |
| *H01M 50/251* | (2021.01) |

(52) U.S. Cl.
CPC ... *H01M 10/6563* (2015.04); *H01M 10/6566* (2015.04); *H01M 50/211* (2021.01); *A62C 3/16* (2013.01); *H01M 10/627* (2015.04); *H01M 10/6567* (2015.04); *H01M 10/6568* (2015.04); *H01M 50/204* (2021.01); *H01M 50/251* (2021.01); *Y02E 60/10* (2013.01)

(58) Field of Classification Search
CPC ......... H01M 10/6563; H01M 10/6566; H01M 10/6567; H01M 10/6568; H01M 50/143; H01M 50/204; H01M 50/211; H01M 50/251

See application file for complete search history.

(56) References Cited

U.S. PATENT DOCUMENTS

| | | | |
|---|---|---|---|
| 2013/0244077 A1 | 9/2013 | Palanchon et al. | |
| 2013/0323551 A1* | 12/2013 | Lee .................. | H01M 10/6556 429/83 |
| 2014/0335390 A1 | 11/2014 | Hwang et al. | |
| 2015/0244036 A1 | 8/2015 | Lane et al. | |
| 2016/0359206 A1* | 12/2016 | Eberleh ............... | H01M 10/613 |
| 2017/0098873 A1 | 4/2017 | Tsuchiya et al. | |
| 2018/0123193 A1 | 5/2018 | Palanchon | |
| 2019/0046820 A1 | 2/2019 | Lee et al. | |
| 2019/0140235 A1 | 5/2019 | Lindstrom et al. | |
| 2020/0006821 A1 | 1/2020 | Oono et al. | |
| 2021/0151821 A1* | 5/2021 | Shim .................. | H01M 10/613 |
| 2022/0006139 A1 | 1/2022 | Yoo et al. | |

FOREIGN PATENT DOCUMENTS

| | | |
|---|---|---|
| JP | 3177969 U | 8/2012 |
| JP | 2013-251127 A | 12/2013 |
| JP | 2013-545219 A | 12/2013 |
| JP | 2014-67654 A | 4/2014 |
| JP | 2014-216092 A | 11/2014 |
| JP | 2020-149943 A | 9/2020 |
| JP | 2022-513105 A | 2/2022 |
| KR | 2001-0028777 A | 4/2001 |
| KR | 10-2012-0120663 A | 11/2012 |
| KR | 10-2013-0122741 A | 11/2013 |
| KR | 10-2016-0037542 A | 4/2016 |
| KR | 10-2017-0019212 A | 2/2017 |
| KR | 10-2018-0032122 A | 3/2018 |
| KR | 10-2019-0012461 A | 2/2019 |
| WO | WO 2012/015004 A1 | 2/2012 |
| WO | WO 2012/045175 A1 | 4/2012 |
| WO | WO 2015/130746 A1 | 9/2015 |
| WO | WO 2018/142674 A1 | 8/2018 |

OTHER PUBLICATIONS

International Search Report for PCT/KR2020/006235 (PCT/ISA/210) mailed on Aug. 21, 2020.

* cited by examiner

BATTERY RACK AND POWER STORAGE DEVICE COMPRISING SAME

TECHNICAL FIELD

The present disclosure relates to a battery rack and an energy storage system including the battery rack.

The present application claims priority to Korean Patent Application No. 10-2019-0066644 filed on Jun. 5, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at present include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module including at least one battery cell first, and then configure a battery pack by using at least one battery module and adding other components. Here, according to various voltage and capacity requirements, an energy storage system may be configured to include battery racks, each having at least one battery pack that includes at least one battery module.

In the case of a conventional battery rack, when an abnormal situation occurs in at least one battery module among the plurality of battery modules in the rack case, ignition may occur in the battery module in which the abnormal situation occurs.

When ignition occurs in any one of the battery modules, if flame and heat propagate to the surrounding battery modules of an adjacent battery rack, it may lead to additional ignition, resulting in serious property damage or great personal injury.

Therefore, there is a need for a method of providing a battery rack capable of preventing flame and heat from propagating to adjacent battery modules when at least one of the battery modules is ignited, and a power storage device including the same.

DISCLOSURE

Technical Problem

Therefore, the present invention is directed to providing a battery rack, which may prevent flame and heat from propagating toward adjacent battery modules when at least one of the battery modules is ignited, and a power storage device including the same.

Technical Solution

In an aspect of the present disclosure, there is provided a battery rack, comprising: a plurality of battery modules, each of the plurality of battery modules having at least one battery cell; a rack case configured to accommodate the plurality of battery modules; and a fire proof unit mounted to be spaced apart from each other by a predetermined distance along a vertical direction of the rack case and configured to support the plurality of battery modules and prevent flame and heat from propagating to adjacent battery modules of the plurality of battery modules when a fire occurs in at least one of the plurality of battery modules.

The fire proof unit may include a plurality of fire proof plates mounted along the vertical direction of the rack case to support the plurality of battery modules, respectively; and a pair of fire proof manifolds configured to communicate with the plurality of fire proof plates and connected to an external cooling system.

Each of the plurality of fire proof plates may include a plate body having a cooling channel formed therein to circulate a cooling medium; an inlet port provided at one side of the plate body and configured to communicate with the cooling channel; and an outlet port provided to the plate body to be spaced apart from the inlet port by a first predetermined distance and configured to communicate with the cooling channel.

The pair of fire proof manifolds may include an inlet manifold connected to the external cooling system to communicate with the inlet ports of the plurality of fire proof plates; and an outlet manifold disposed to be spaced apart from the inlet manifold by a second predetermined distance and connected to the external cooling system to communicate with the outlet ports of the plurality of fire proof plates.

The inlet manifold may include a plurality of inlet port connection portions connected to the inlet ports of the plurality of fire proof plates; and a system connection inlet portion disposed at a side opposite to the plurality of inlet port connection portions and connected to the external cooling system.

The outlet manifold may include a plurality of outlet port connection portions connected to the outlet ports of the plurality of fire proof plates; and a system connection outlet portion disposed at a side opposite to the plurality of outlet port connection portions and connected to the external cooling system.

The plate body may be made of a pair of aluminum plates.

The cooling channel may be provided by coupling the pair of aluminum plates to each other.

Each of the plurality of battery modules may include a cooling fan for cooling the at least one battery cell.

In another aspect of the present disclosure, there is also provided an energy storage system, comprising: at least one battery rack according to the above embodiments; and a rack container configured to accommodate the at least one battery rack.

Advantageous Effects

According to various embodiments as described above, it is possible to provide a battery rack, which may prevent flame and heat from propagating toward adjacent battery modules when at least one of the battery modules is ignited, and a power storage device including the same.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
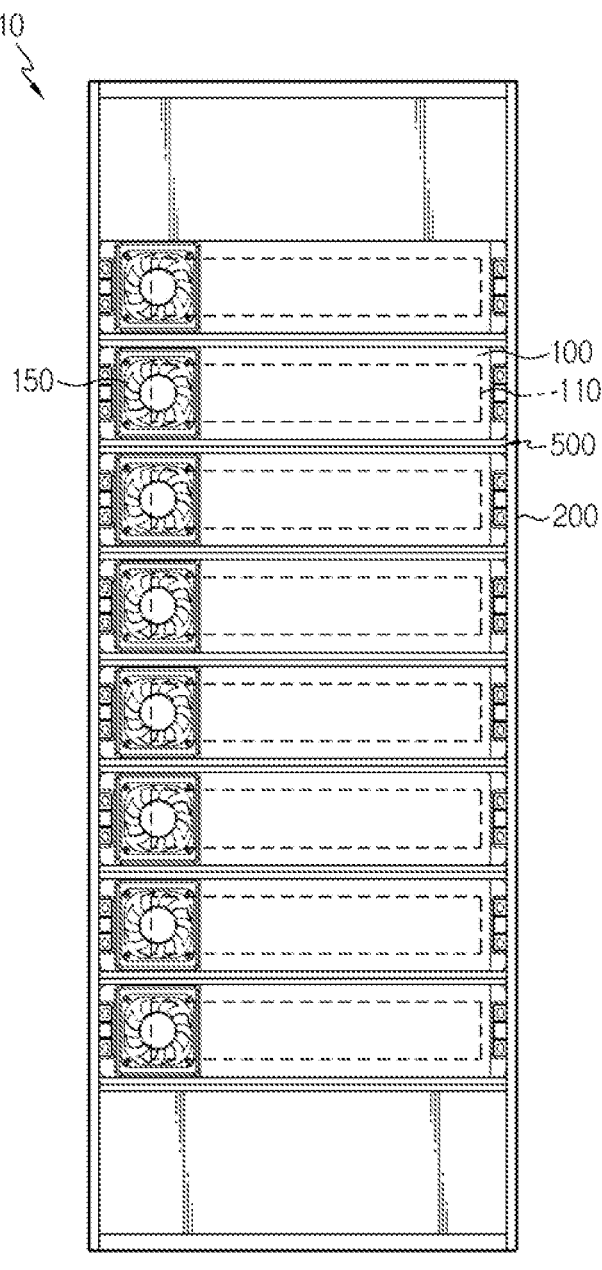
FIG. 1 is a diagram for illustrating a battery rack according to an embodiment of the present disclosure.
Figure 2:
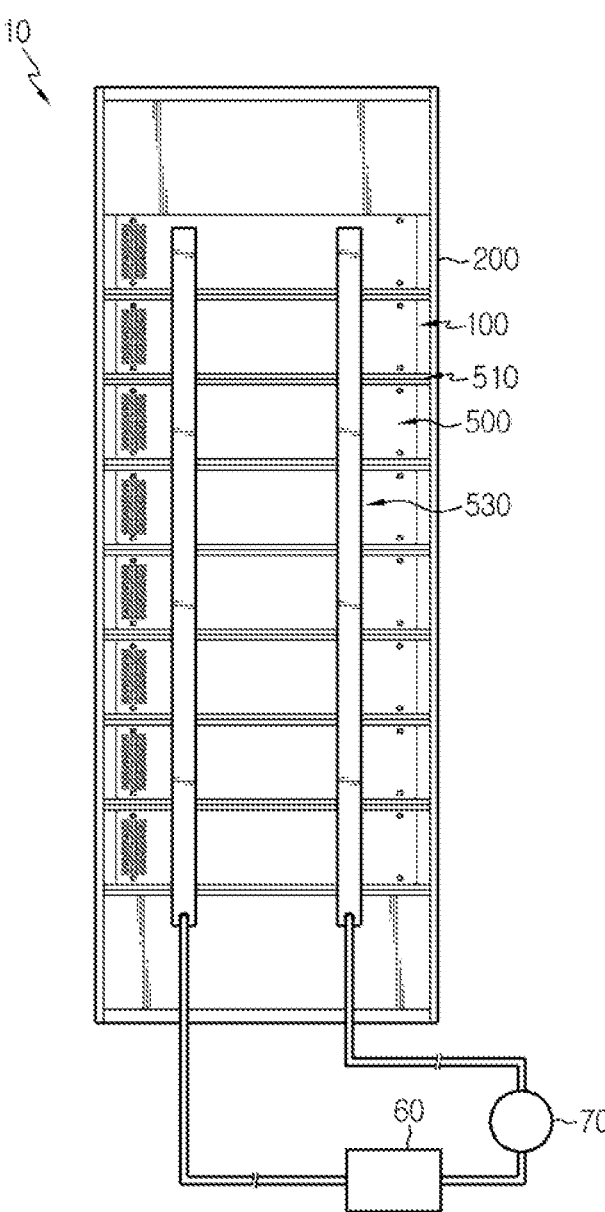
FIG. 2 is a rear view showing the battery rack of FIG. 1.
Figure 3:
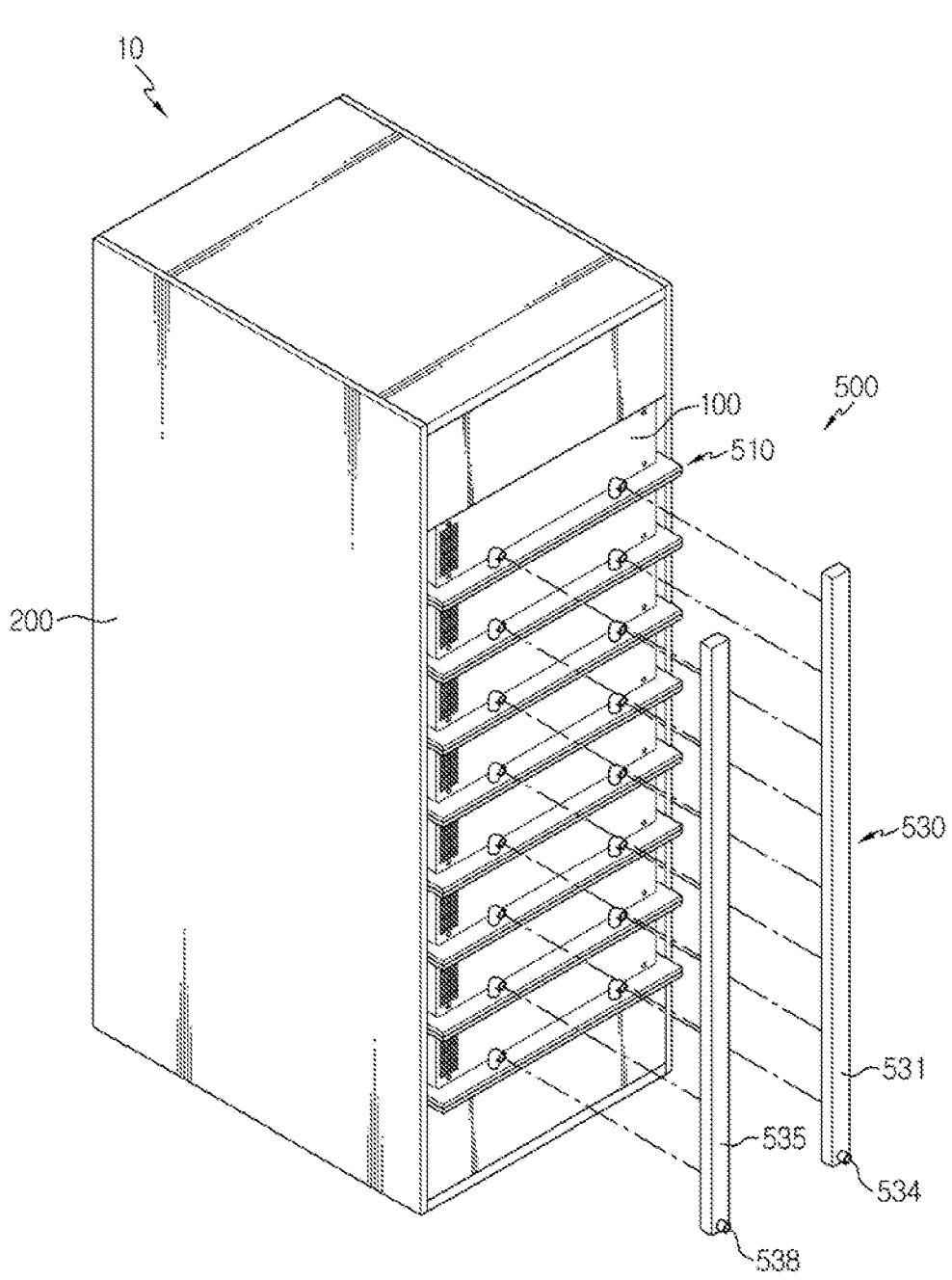
FIG. 3 is an exploded perspective view showing the battery rack of FIG. 2.
Figure 4:
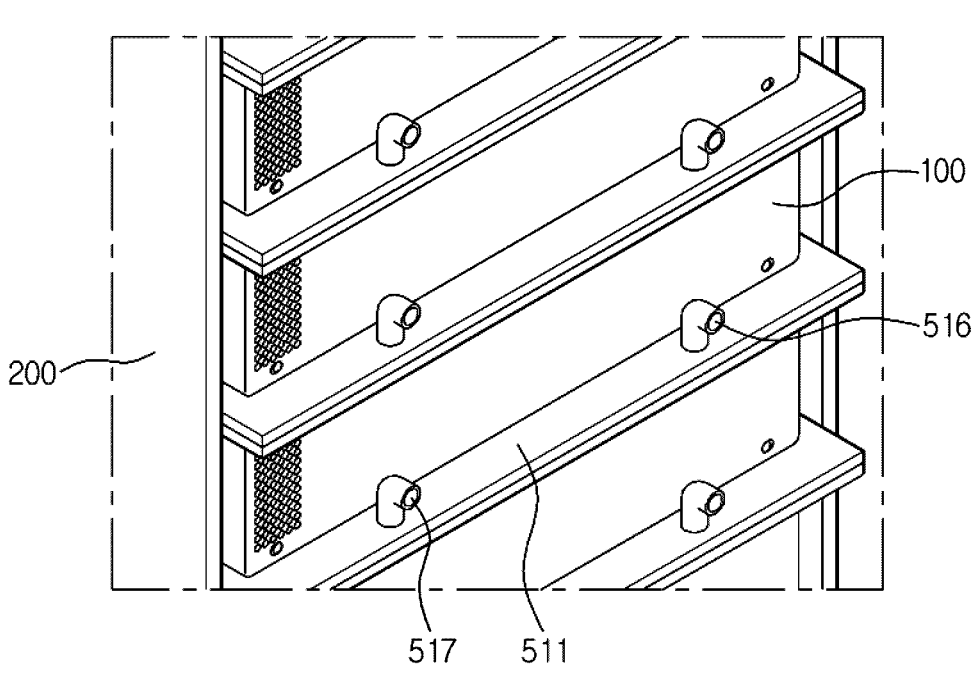
FIG. 4 is an enlarged view showing a main part of the battery rack of FIG. 3.
Figure 5:
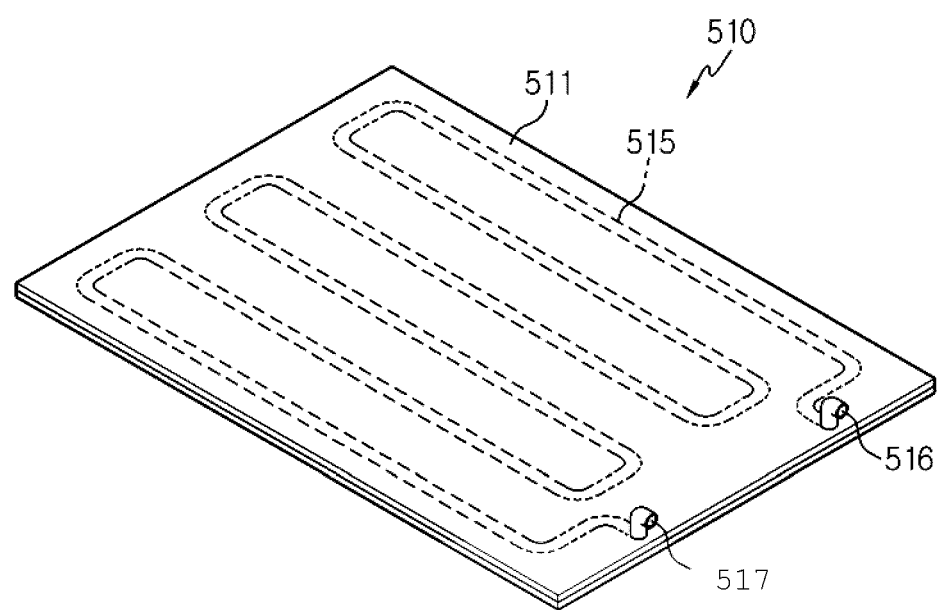
FIG. 5 is a diagram for illustrating a fire proof plate of a fire proof unit employed at the battery rack of FIG. 3.
Figure 6:
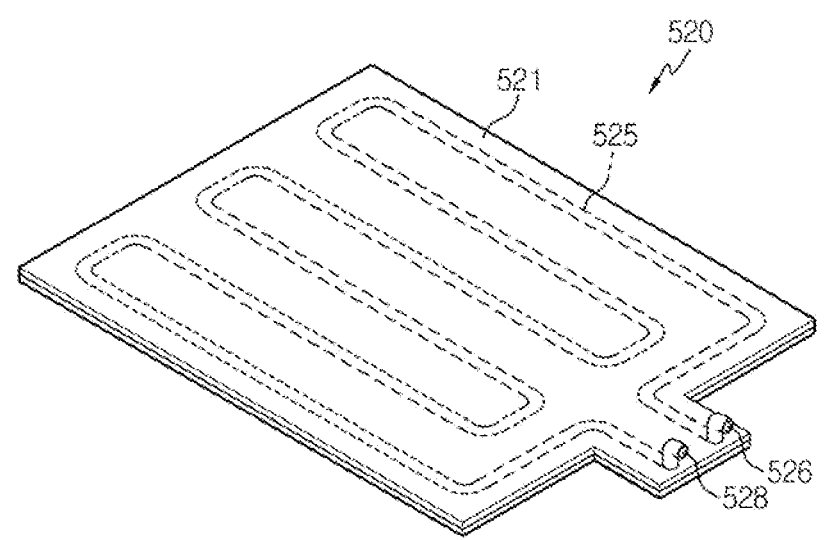
FIG. 6 is a diagram for illustrating another embodiment of the fire proof plate of FIG. 5.
Figure 7:
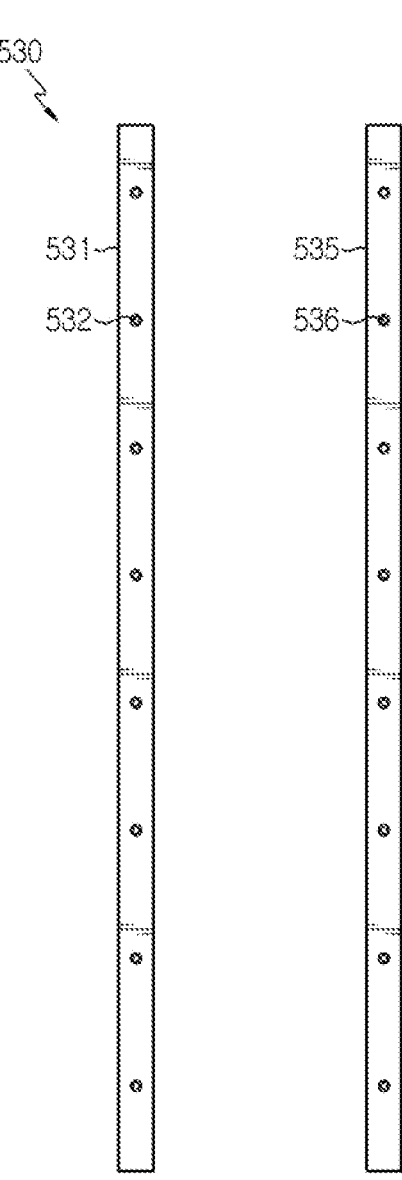
FIG. 7 is a diagram for illustrating a fire proof manifold employed at the battery rack of FIG. 3.

FIG. 1 is a diagram for illustrating a battery rack according to an embodiment of the present disclosure, FIG. 2 is a rear view showing the battery rack of FIG. 1, FIG. 3 is an exploded perspective view showing the battery rack of FIG. 2, FIG. 4 is an enlarged view showing a main part of the battery rack of FIG. 3, FIG. 5 is a diagram for illustrating a fire proof plate of a fire proof unit employed at the battery rack of FIG. 3, FIG. 6 is a diagram for illustrating another embodiment of the fire proof plate of FIG. 5, and FIG. 7 is a diagram for illustrating a fire proof manifold employed at the battery rack of FIG. 3.

Referring to FIGS. 1 to 7, a battery rack 10 may include a battery module 100, a rack case 200 and a fire proof unit 500.

The battery module 100 may be provided in plural. Each of the plurality of battery modules 100 may include a battery cell 110 and a cooling fan 150.

The battery cell 110 is a secondary battery, and one battery cell or a plurality of battery cells may be provided. The battery cell 110 may be at least one of a pouch-type secondary battery, a rectangular secondary battery, and a cylindrical secondary battery. Hereinafter, in this embodiment, the battery cell 110 will be described as a pouch-type secondary battery.

The cooling fan 150 is used for cooling the at least one battery cell 110 or the plurality of battery cells 110, and may be provided at one side of the battery module 100.

The rack case 200 may accommodate the plurality of battery modules 100. To this end, the rack case 200 may have an accommodation space for accommodating the plurality of battery modules 100.

The fire proof unit 500 is to prevent flame and heat from propagating to adjacent battery modules 100 when a fire occurs in at least one of the plurality of battery modules 100, and is mounted to be spaced apart by a predetermined distance apart along a vertical direction of the rack case 200 to support each battery module 100.

The fire proof unit 500 may include a fire proof plate 510 and a fire proof manifold 530.

The fire proof plate 510 may be provided in plural. The plurality of fire proof plates 510 support the battery modules 100, respectively, and may be mounted along the vertical direction of the rack case 200.

Each of the plurality of fire proof plates 510 may include a plate body 511, a cooling channel 515, an inlet port 516, and an outlet port 517.

The plate body 511 may be made of a pair of aluminum plates. The pair of aluminum plates may be coupled to each other to form the plate body 511.

The cooling channel 515 is for circulation of a cooling water, and may be provided inside the plate body 511. The cooling channel 515 may be prepared by coupling the pair of aluminum plates to each other.

The inlet port 516 is provided at one side of the plate body 511 and may communicate with the cooling channel 515. The outlet port 517 is provided to the plate body 511 to be spaced apart from the inlet port 516 by a predetermined distance, and may communicate with the cooling channel 515.

Referring to FIG. 6, the fire proof plate 520 may be provided in a different form from the former embodiment. Specifically, the fire proof plate 520 may include a plate body 511, a cooling channel 525, an inlet port 526, and an outlet port 528.

Unlike the former embodiment, one side of the plate body 511 at which the inlet port 526 and the outlet port 528 are provided may be formed to protrude relatively further to the other part. Accordingly, the cooling channel 525 may be more compactly disposed within the plate body 521.

The fire proof manifold 530 is provided in a pair, and may be made of metal or plastic. The pair of fire proof manifolds 530 communicate with the plurality of fire proof plates 510 and may be connected to an external cooling system 60. Meanwhile, a pump unit 70 may be provided between the pair of fire proof manifolds 530 and the external cooling system 60 so that a cooling water may be supplied to the fire proof unit 500 more smoothly.

The pair of fire proof manifolds 530 may include an inlet manifold 531 and an outlet manifold 535.

The inlet manifold 531 is connected to the external cooling system 60, and may communicate with the inlet ports 516 of the plurality of fire proof plates 510.

The inlet manifold 531 may include an inlet port connection portion 532 and a system connection portion 534.

The inlet port connection portion 532 may be connected to the inlet ports 516 of the plurality of fire proof plates 510. The system connection portion 534 is disposed at a side opposite to the plurality of inlet port connection portions 532 and may be connected to the external cooling system 60.

The outlet manifold 535 is disposed to be spaced apart from the inlet manifold 531 by a predetermined distance, and may be connected to the external cooling system 60 to communicate with the outlet ports 517 of the plurality of fire proof plates 510.

The outlet manifold 535 may include an outlet port connection portion 536 and a system connection portion 538.

The outlet port connection portion 536 may be connected to the outlet ports 517 of the plurality of fire proof plates 510. The system connection portion 538 is disposed at a side opposite to the plurality of outlet port connection portions 536 and may be connected to the external cooling system 60.

Hereinafter, the operation of preventing flame and heat from propagating when a fire occurs at the battery module 100 of the battery rack 10, performed by the fire proof unit 500, according to this embodiment will be described in more detail.

Figure 8:
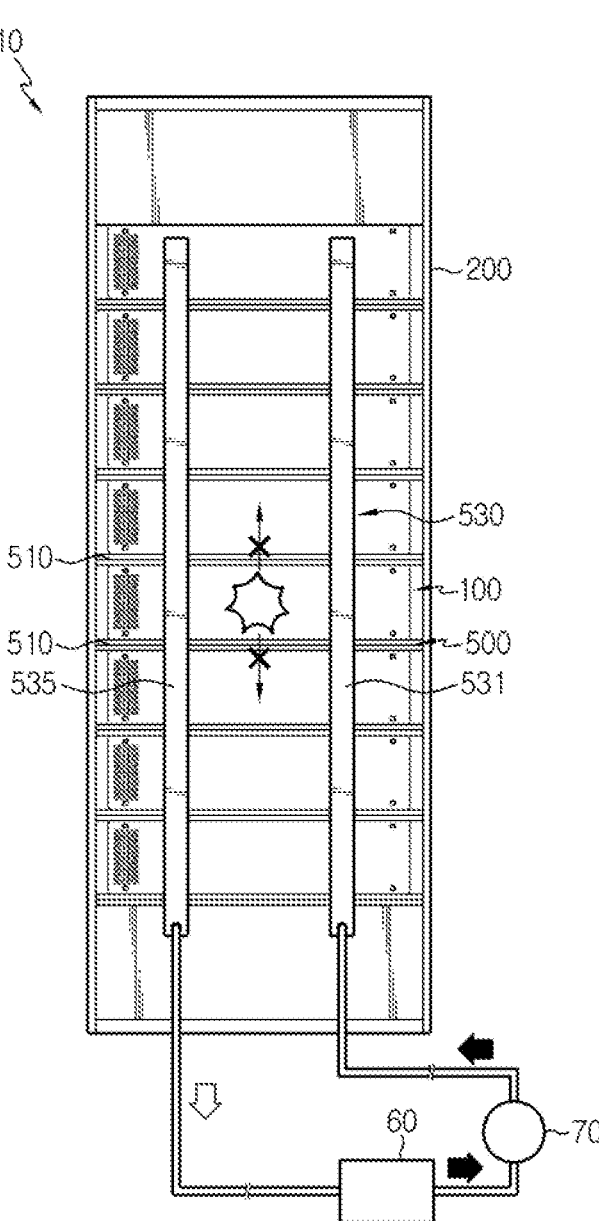
FIG. 8 is a diagram for illustrating an operation of preventing flame and heat from propagating when a fire occurs at a battery module of the battery rack of FIG. 1.

FIG. 8 is a diagram for illustrating an operation of preventing flame and heat from propagating when a fire occurs at a battery module of the battery rack of FIG. 1.

Referring to FIG. 8, an abnormal situation may occur in at least one of the plurality of battery modules 100 of the battery rack 10, for example any one battery module 100. If such an abnormal situation occurs, a fire may occur in the any one battery module 100.

In this embodiment, since the fire proof plates 510 of the fire proof unit 500 are placed between the battery modules 100, respectively, the fire proof plates 510 may preferentially prevent flame and heat from propagating toward adjacent battery modules 100 from the battery module 100 where the fire has occurred.

Moreover, since the cooling water provided from the external cooling system 60 through the fire proof manifold 530 is circulated in the cooling channels 515 of the fire proof plates 510, the battery module 100 where the fire has occurred may be quickly cooled.

That is, in this embodiment, since the battery module 100 is cooled through the fire proof unit 500 in addition to the cooling fan 150, even if a fire occurs at any one battery module 100, the battery module 100 where the fire has occurred may be quickly cooled.

In other words, in this embodiment, it is possible to effectively implement a flame retardant effect in a mechanical aspect and a heat dissipation effect in a thermal aspect through the fire proof unit 500. In addition, the fire proof unit 500 may more stably support the battery modules 100 stacked in the rack case 200 because the battery modules 100 are mounted to the plurality of fire proof plates 510.

As described above, in this embodiment, by means of the fire proof unit 500, it is possible to effectively prevent flame and heat from propagating toward adjacent battery modules 100 when a fire occurs in at least one of the battery modules 100.

Figure 9:
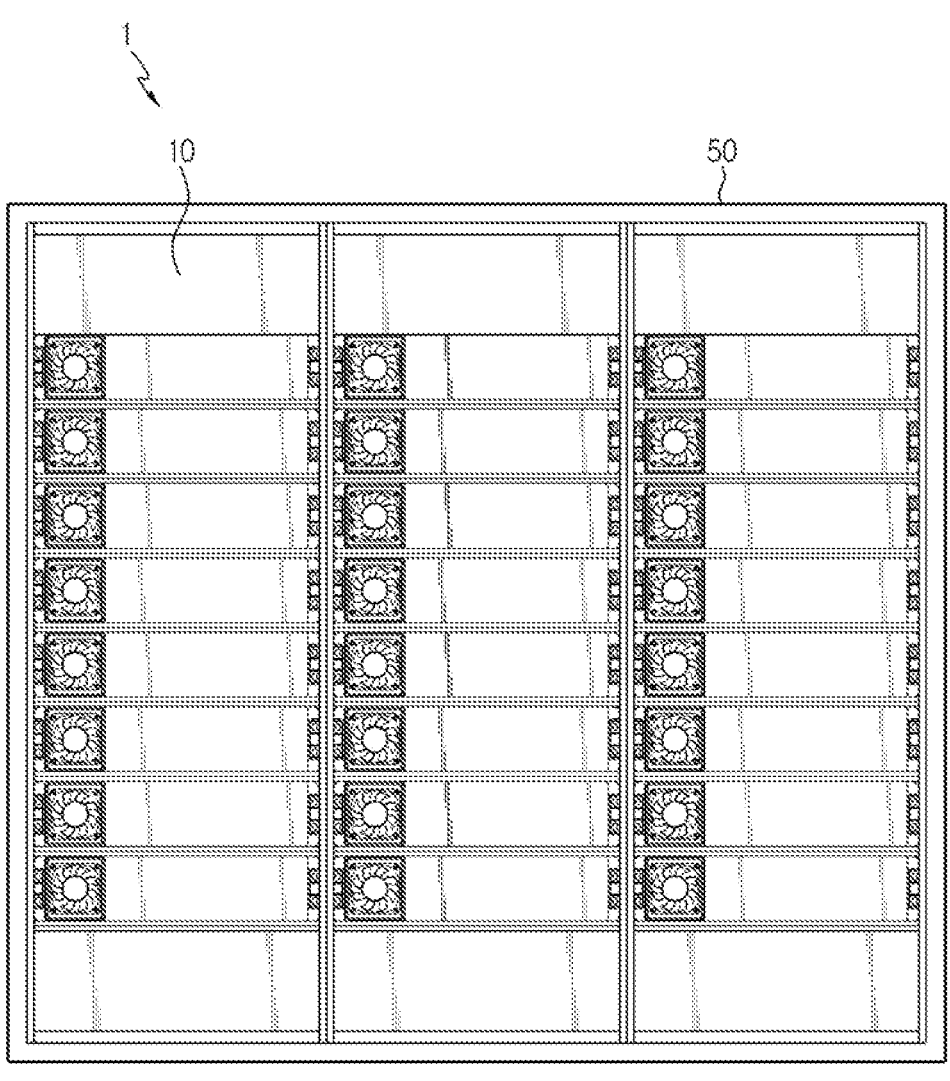
FIG. 9 is a diagram for illustrating an energy storage system according to an embodiment of the present disclosure.

FIG. 9 is a diagram for illustrating an energy storage system according to an embodiment of the present disclosure.

Referring to FIG. 9, an energy storage system 1 serves as an energy source and may be used for home or industrial use. The energy storage system 1 may include at least one battery rack 10 of the former embodiment, or a plurality of battery racks 10 in this embodiment, and a rack container 50 for accommodating the plurality of battery racks 10.

Since the energy storage system 1 according to this embodiment includes the battery rack 10 of the former embodiment, it is possible to provide an energy storage system 1 having all advantages of the battery rack 10 of the former embodiment.

According to various embodiments as described above, it is possible to provide the battery rack 10 capable of preventing flame and heat from propagating toward adjacent battery modules 100 when at least one of the battery modules 100 is ignited, and the energy storage system 1 including the same.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery rack, comprising:
a plurality of battery modules, each of the plurality of battery modules having at least one battery cell;
a rack case configured to accommodate the plurality of battery modules;
a plurality of fire proof plates mounted along a vertical direction of the rack case to support the plurality of battery modules and prevent flame and heat from propagating to adjacent battery modules of the plurality of battery modules when a fire occurs in at least one of the plurality of battery modules; and
a pair of fire proof manifolds at a first side of the plate body and configured to communicate with the plurality of fire proof plates and connected to an external cooling system,
wherein each of the plurality of fire proof plates includes:
a plate body having a serpentine cooling channel formed therein to circulate a cooling medium;
an inlet port at the first side of the plate body and configured to communicate with the cooling channel; and
an outlet port at the first side of the plate body and configured to communicate with the cooling channel,
wherein each of the plurality of fire proof plates has a planar shape, and
wherein the pair of fire proof manifolds includes an inlet manifold and an outlet manifold, an inlet port connection portion of the inlet manifold is directly connected to the inlet ports, and an outlet port connection portion of the outlet manifold is directly connected to the outlet ports.

2. The battery rack according to claim 1, wherein the inlet manifold is connected to the external cooling system to communicate with the inlet ports of the plurality of fire proof plates; and
wherein the outlet manifold is disposed to be spaced apart from the inlet manifold by a second predetermined distance and connected to the external cooling system to communicate with the outlet ports of the plurality of fire proof plates.

3. The battery rack according to claim 2, wherein the inlet manifold includes:
a plurality of inlet port connection portions connected to the inlet ports of the plurality of fire proof plates; and
a system connection inlet portion disposed at a side opposite to the plurality of inlet port connection portions and connected to the external cooling system.

4. The battery rack according to claim 2, wherein the outlet manifold includes:
a plurality of outlet port connection portions connected to the outlet ports of the plurality of fire proof plates; and a system connection outlet portion disposed at a side opposite to the plurality of outlet port connection portions and connected to the external cooling system.

5. The battery rack according to claim 1, wherein the plate body is made of a pair of aluminum plates.

6. The battery rack according to claim 5, wherein the cooling channel is provided by coupling the pair of aluminum plates to each other.

7. The battery rack according to claim 1, wherein each of the plurality of battery modules includes a cooling fan for cooling the at least one battery cell.

8. An energy storage system, comprising:

at least one battery rack as defined in claim 1; and a rack container configured to accommodate the at least one battery rack.

9. The battery rack according to claim 1, wherein the inlet port and the outlet port extend upward from a top surface of the plate body.

10. The battery rack according to claim 1, wherein a width of the pair of fire proof manifolds is less than a width of the first side of the plate body.

* * * * *